W. H. SILSBY.
Grain-Separator.
No. 221,621. Patented Nov. 11, 1879.
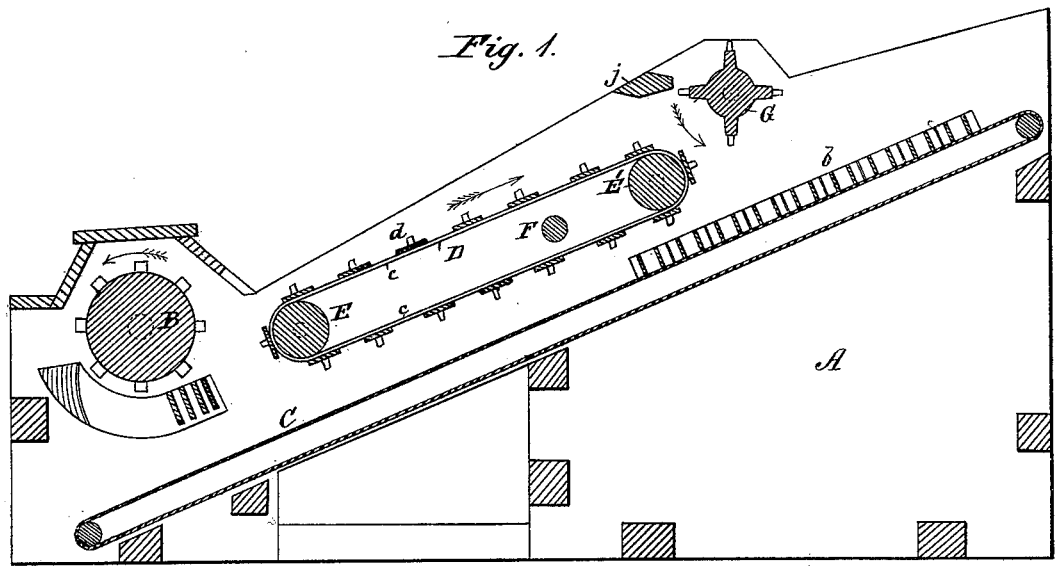
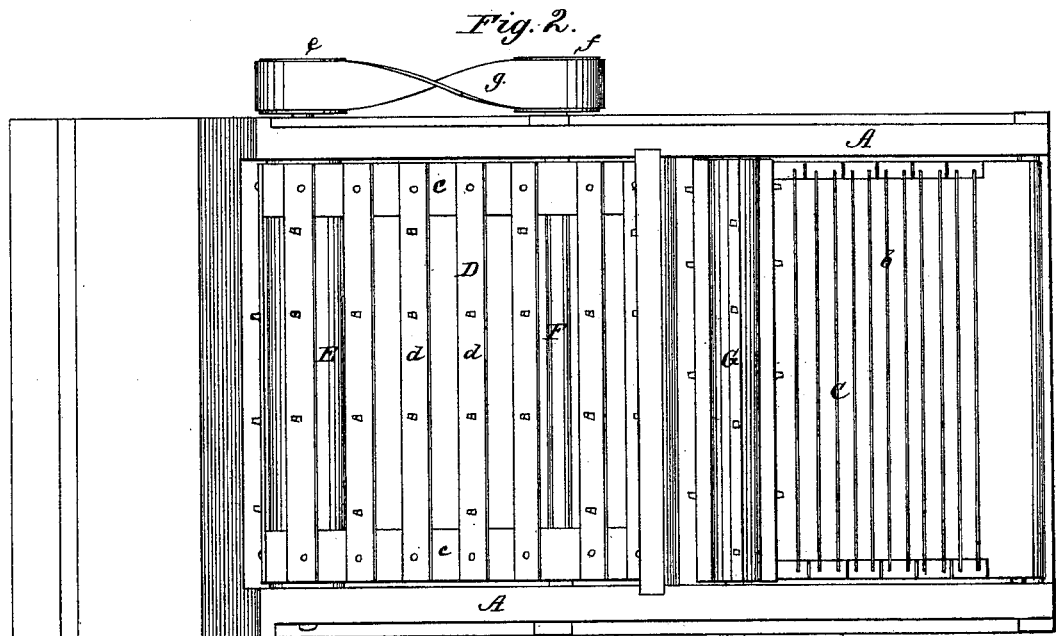
WITNESSES:
W. W. Hollingsworth
Edw. W. Byrn
INVENTOR:
W. H. Silsby
BY
ATTORNEYS.

UNITED STATES PATENT OFFICE.

WILLIAM H. SILSBY, OF CHICO, CALIFORNIA.

IMPROVEMENT IN GRAIN-SEPARATORS.

Specification forming part of Letters Patent No. 221,621, dated November 11, 1879; application filed June 25, 1879.

*To all whom it may concern:*

Be it known that I, WILLIAM H. SILSBY, of Chico, in the county of Butte and State of California, have invented a new and Improved Grain-Separator; and I do hereby declare that the following is a full, clear, and exact description of the same, reference being had to the accompanying drawings, forming part of this specification, in which—

Figure 1 is a vertical longitudinal section. Fig. 2 is a plan view.

My invention relates to certain improvements in grain-separators of that class in which the grain is thrashed, and the latter immediately separated from the straw by endless belts.

The improvement consists in the peculiar arrangement of parts for securing a better separation of the grain, as hereinafter described, and pointed out in the claim.

In the drawings, A represents the framework of a separator, on the lower end of which is journaled, in suitable boxes, the thrashing-cylinder B, below which is fixed the usual concave grate or bed, between which and the cylinder the grain passes as it is thrashed.

C is the grain belt, which passes around two rollers, of which one is located beneath the cylinder, and the other is journaled in an elevated portion of the frame-work to the rear of the machine. This belt is provided with transverse pockets or grain-cells $b$, which, as the belt travels, pass up the incline and deliver the grain to the sieves of the fanning-mill. (Not shown.)

D is the straw-carrier. This consists of leather belts $c\ c$, connected by metal or wooden strips $d$, having teeth projecting from the same. This carrier passes over and under the shaft F and above the grain-belt, around a solid or tightly-closed drum, E, located just in front of the discharge-space of the cylinder, and around a second drum, E', located higher up and farther to the rear of the frame. This straw-carrier is operated by a pulley, $e$, upon the lower drum, which is connected to a pulley, $f$, on a shaft, F, by means of a crossed belt, $g$. This shaft F derives motion from any suitable source, and is also connected with and imparts motion to a beater, G, by a belt, $h$, and pulley $i$. This beater is provided with teeth, and has a rigid bar or board, $j$, just in front of the same, which extends from side to side of the frame.

Now, in the operation of the separator, as the grain and commingled straw are discharged from the cylinder, the straw-carrier receives the straw, while the grain drops through upon the grain-carrier and is carried up the incline of the belt to the fan. As the straw rises it passes under the bar $j$ in the front of the beater and then under the beater, which revolves in the opposite direction to the carrier, the action of the beater being to shake out or remove such grain as remains in the straw, and to force the grain into the cells of the grain-carrier and the straw up the incline, and prevent it from piling up on the carrier. With respect to the arrangement of the lower drum of the straw-carrier, this is fixed directly in rear of the thrashing-cylinder, so that said drum receives the impact of the grain as it is forcibly discharged from the cylinder, and acts as a shield to prevent the grain from striking and wearing out the cells of the grain-carrier.

The straw-carrier and beater may be run at any desired speed to better separate the straw from the grain, and thus drive the grain into the grain-carrier cells. The teeth of the straw-carrier, operating with the teeth of the beater, separate any mass of straw and grain which may come past the cylinder, thereby preventing any mass from falling upon the sieve of the fanning-mill and clogging it, and leaves the straw separated and shaken up light, so that the usual straw-carrier of the separator must separate whatever grain may be left.

This improvement may be added to any separator without altering the frame of the machine, and may be placed upon nearly all of them without altering them at all. It saves grain and protects the grain-carrier of the separators by relieving it of all wear and tear from the force of the action of the cylinder.

In defining my invention more clearly, I would state that I do not claim, broadly, the combination of a grain-cell belt, a straw-carrier, and a beater-shaft, but only the peculiar arrangement of parts shown in my drawings, in which the cell-belt extends from a position beneath the cylinders to a point past the end of the straw-carrier and beater, and in which the open straw-carrying belt has its front roller opposed directly to the discharge of the cylinder, and has near its rear end a bar, $j$, and beater G, which drives the grain through the straw into the cells below. This peculiar arrangement secures a great saving in the grain, for the straw-carrier takes the straw from the cylinder quickly and uniformly and in a loose manner, and does not allow the straw to pile up and become so compact as to hold masses of grain on the top of the same. The straw being loose, then, the beater drives the grain through the same upon the cell-belt below. The straw-carrier, then, when arranged as shown, not only protects the cell-belt from wear, but prevents the straw from clogging in front of the cylinder, and keeps it sufficiently loose to permit the beater to drive the grain through the same, and separate it thoroughly from the straw.

Having thus described my invention, what I claim as new is—

The combination, with the cylinder B, of the open straw-carrier belt D, having its roller opposed directly to the discharge of the cylinder, the cross-bar $j$, and beater G, arranged at the rear end of the straw-carrier, and the cell-belt C, extending from a point below the cylinder to a point past the beater, substantially as shown and described.

WILLIAM HENRY SILSBY.

Witnesses:
GEORGE MILLER,
ORSON MERRIAM.